United States Patent [19]
White et al.

[11] Patent Number: 6,035,299
[45] Date of Patent: Mar. 7, 2000

[54] MAPPING SYSTEM WITH HOUSE NUMBER REPRESENTATION

[75] Inventors: Kerry M. White, Rancho Palos Verdes; David T. Schaaf, Los Angeles, both of Calif.

[73] Assignee: Alpine Electronics, Inc., Tokyo, Japan

[21] Appl. No.: 08/920,119

[22] Filed: Aug. 26, 1997

[51] Int. Cl.[7] ..................................................... G06F 17/30
[52] U.S. Cl. ........................... 707/101; 707/102; 707/100
[58] Field of Search ................................ 707/1, 101, 102, 707/100

[56] References Cited

U.S. PATENT DOCUMENTS

| | | | |
|---|---|---|---|
| 4,272,901 | 6/1981 | Mathews | 40/574 |
| 4,854,062 | 8/1989 | Bayo | 40/551 |
| 4,868,570 | 9/1989 | Davis | 341/106 |
| 4,926,336 | 5/1990 | Yamada | 364/444 |
| 5,270,937 | 12/1993 | Link et al. | 364/449 |
| 5,410,485 | 4/1995 | Ichikawa | 364/444 |
| 5,497,888 | 3/1996 | Michaels et al. | 211/10 |
| 5,504,683 | 4/1996 | Gurmu et al. | 364/436 |
| 5,521,578 | 5/1996 | DelValle | 340/330 |
| 5,621,993 | 4/1997 | Stover | 40/638 |
| 5,664,189 | 9/1997 | Wilcox et al. | 707/205 |
| 5,680,616 | 10/1997 | Williams et al. | 707/103 |
| 5,696,684 | 12/1997 | Ueberschaer | 364/443 |
| 5,761,640 | 6/1998 | Kalyanswamy et al. | 704/260 |
| 5,784,069 | 7/1998 | Daniels et al. | 345/467 |
| 5,806,057 | 9/1998 | Gormley et al. | 707/1 |

*Primary Examiner*—Thomas G. Black
*Assistant Examiner*—Frantz Coby
*Attorney, Agent, or Firm*—Brinks Hofer Gilson & Lione

[57] ABSTRACT

A four-byte data structure for representing alphanumeric or numeric house numbers (addresses) for use in a mapping system. The data structure has the same field size as that used for representing house numbers with numeric characters. One bit of the data structure is used to determine the presence of a non-numeric character in the house number. If the bit stream defined by bit positions 30-28 is either "000" or "100" or 101" or "110" or "111", then fourteen bits represent the numeric portion preceding the alphabetic character, ten bits represent the numeric portion succeeding the alphabetic character, two bits represent leading zeroes preceding any alphabetic and numeric characters and two bits represent leading zeroes disposed after an alphabetic character and before a numeric character succeeding the alphabetic character. If the bit stream defined by bit positions 30-28 is "001", then one bit identifies whether the first character of a house number is numeric or non-numeric, thirteen bits identify the alphabetic character used in a house number, ten bits represent house numbers larger than 999 or represent characters other than the alphabetic characters, ten bits represent the numeric portion of a house number and two bits represent leading zeroes.

27 Claims, 2 Drawing Sheets

| STEP TAKEN | NUMBER A | NUMBER B |
|---|---|---|
| STEPS | 100 - 01 | 100 - 1 |
| ALPHANUMERIC OR NUMERIC | ALPHANUMERIC | ALPHANUMERIC |
| ALPHABETIC CHARACTER | - | - |
| NUMERIC CHARACTER BEFORE THE ALPHABETIC CHARACTER | 100 | 100 |
| NUMERIC CHARACTERS AFTER THE ALPHABETIC CHARACTER | 1 | 1 |
| LENGTH AFTER THE ALPHABETIC CHARACTER | 2 | 1 |

FIG. 1
PRIOR ART

```
#DEFINE SIZEOF_SEPARATOR

TYPEDEF STRUCT
{
        SHORT       BEFORE_SEPARATOR;

SHORT       AFTER_SEPARATOR;

CHAR        SEPARATOR [SIZEOF_SEPARATOR];

CHAR        LENGTH_AFTER_SEPARATOR;

} ALPHA_NUMBER;

TYPEDEF UNION {

ALPHA_NUMBER    ALPHANUMBER;

LONG            LONGNUMBER;

} NUMBER_DATA;

TYPEDEF STRUCT
{
        NUMBER_DATA   NUMBERDATA;

CHAR          NUMBER_TYPE;

} HOUSE_NUMBER;
```

◄ – – – – – – – DATA STRUCTURE 100

FIG. 2

| STEP TAKEN | NUMBER A | NUMBER B |
|---|---|---|
| STEPS | 100 - 01 | 100 - 1 |
| ALPHANUMERIC OR NUMERIC | ALPHANUMERIC | ALPHANUMERIC |
| ALPHABETIC CHARACTER | - | - |
| NUMERIC CHARACTER BEFORE THE ALPHABETIC CHARACTER | 100 | 100 |
| NUMERIC CHARACTERS AFTER THE ALPHABETIC CHARACTER | 1 | 1 |
| LENGTH AFTER THE ALPHABETIC CHARACTER | 2 | 1 |

MAPPING SYSTEM WITH HOUSE NUMBER REPRESENTATION

FIELD OF THE INVENTION

The present invention relates to a mapping and to a vehicle navigation system and, more particularly, to a method for storing house numbers for use in a mapping/navigation system.

DESCRIPTION OF THE RELATED ART

Vehicle navigation systems are well known, see e.g. Yamada et al., U.S. Pat. No. 4,926,336; Link et al., U.S. Pat. No. 5,270,937; and Ichikawa, U.S. Pat. No. 5,410,485, all incorporated by reference. Such navigation systems generally perform two major functions. One function is to identify the optimum route from the present location to a desired destination, a process which is generally referred to as route guidance. The other function is to display a map of both the present location and of the identified route.

A database containing a digitized map of the road network, house numbers, etc. is provided to a vehicle navigation system. To be useful, such a database must be flexible enough so as to allow for inclusion of all address numbering systems that have been adopted by different states. One such address numbering system, common in most of the United States, calls for house numbers that contain numeric characters only and have a predefined range of 0 to 999999. In other locations a hyphen or an alphabetic character is disposed among numeric characters to represent a house number. Three such cases exist:

Case 1

An alphabetic character E, N, S or W is disposed among numeric characters. e.g. 3E199, 17N017, 16S001 and 5W200.

Case 2

A hyphen is disposed among numeric characters. e.g. 10-250, 17-190.

Case 3

A number of leading zeros is disposed before a hyphen and/or a number of leading zeroes is disposed after a hyphen. e.g. 170-1, 170-001 and 170-002.

A data structure used to generate a database of house numbers for use in a mapping system must, therefore, be able to encompass all possible permutations that a house numbering scheme which uses both numeric and alphabetic characters may generate. One such known data structure 100 (devised by SEI Information Technologies, Incorporated) is illustrated in FIG. 1. As can be seen from FIG. 1, depending on the operating system and the type of computer system used, data structure HOUSE_NUMBER requires from 11 to 24 bytes of data, to store alphanumeric house numbers. Hereinafter, a byte refers to a stream of 8 binary digits; an alphanumeric number refers to a string of numeric, alphabetic as well as special printable characters and a numeric number refers to a string of numeric-only characters. Examples of special printable characters include, "/", "-". Examples of numeric numbers include 136457 and 23988. Examples of alphanumeric numbers include 312W786, 017-007. Data structure 100, however, is inadequate for use in a navigation system for the reasons that follow.

First, many mapping/navigation systems store house numbers in a memory unit that is only four bytes wide and, as such, must be adapted in order to accommodate the typically twelve bytes wide data structure of FIG. 1. Consequently, data structure 100 is not viable for use in many mapping/vehicle navigation systems.

Second, data structure 100 requires an excessively large memory space to store the needed information.

Third, data structure 100 does not lend itself to an efficient sorting process. Up to 5 relational operations may be required to complete the sorting of data which have been represented according to data structure 100. Relational operations are well known in the art and comprise the following set "<" designating the operation "less than"

"<=" designating the operation "less than or equal to"

">" designating the operation "greater than"

">=" designating the operation "greater than or equal to"

"=" designating the operation "equal to"

FIG. 2 illustrates the steps required to sort through alphanumeric numbers 100-01 and 100-1 according to data structure 100. In step 1, the sorting routine determines whether the house numbers are numeric or alphanumeric. An alphabetic character present in an alphanumeric number is identified in step 2. In step 3 and 4 the numeric characters preceding and succeeding the alphabetic character are identified respectively. Leading zeroes succeeding an alphabetic character are ignored in step 4. Finally, in step 5, the number of numeric characters, including the number of leading zeroes, succeeding the alphabetic character are determined to complete the sorting process.

Fourth, data structure 100 is not backward compatible with numeric numbering systems. Consequently, data structure 100 is ineffective in representing house numbers which contain numeric characters only.

Fifth, data structure 100 lacks the capability to represent leading zeroes where they precede any alphabetic and numeric characters. For example, the two leading zeroes appearing before numeric character "1" in number 001-007 cannot be represented by data structure 100.

SUMMARY

In accordance with the present invention, a data structure which is four bytes (32 bits) stores and represents alphanumeric house numbers for use in a mapping system for e.g. a vehicle navigation system. ("House number" here means generally numerical addresses.)

Bit 31 of the data structure designates the presence or the absence of an alphabetic/printable character in a house number. Bits 30–28 provide additional information about the possible type of non-numeric character used in a house number. If the bit stream defined by bit positions 30–28 is either "000" or "100" or 101" or "110" or "111", then bits 27–14 represent the numeric portion of a house number preceding the alphabetic character, bits 13–4 represent the numeric portion of a house number succeeding the alphabetic character, bits 3–2 represent leading zeroes disposed before any numeric character preceding an alphabetic character and bits 1–0 represent leading zeroes disposed after an alphabetic character and before a succeeding numeric character. If the bit stream defined by bit positions 30-28 is "001", then bit 27 identifies whether the first character of a house number is numeric or alphabetic, bits 26–22 identify the alphabetic character used in a house number, bits 21–12 represent house numbers larger than 999 or represent characters other than the alphabetic characters, bits 11–2 represent the numeric portion of a house number and bits 1–0 represent leading zeroes.

The data structure requires the same field size as that used to represent numeric house numbers and, as such, is backwards compatible with the memory unit of many vehicle navigation systems. Moreover, the structure requires only one relational operation to perform a sorting of numbers.

BRIEF DESCRIPTION OF THE DRAWINGS

FIG. 1 defines a known data structure for the array variable HOUSE_NUMBER, used for representing and storing alphanumeric house numbers.

FIG. 2 illustrates the steps necessary to resolve the sorting hierarchy of the array members 100-01 and 100-1 of the array variable HOUSE_NUMBER as defined in FIG. 1.

DETAILED DESCRIPTION

The present invention provides a bit-packed method of storing and representing a substantial combinations of house numbers of the type used in the United States, using an unsigned integer data field which is only four bytes wide. The data structure in accordance with the present invention is described below.

Bit 31

This is the most significant bit and is used to indicate whether a house number includes a non-numeric character.

0=House number includes only numeric characters

1=House number includes alphanumeric characters

Bits 30–28

These three bits identify the non-numeric character that is used in the house numbering system, according to the following table:

| Bit 30 | Bit 29 | Bit 28 | Numeric Character |
|---|---|---|---|
| 0 | 0 | 0 | - (hyphen) |
| 0 | 0 | 1 | *see the definition below |
| 0 | 1 | 0 | undefined |
| 0 | 1 | 1 | undefined |
| 1 | 0 | 0 | E |
| 1 | 0 | 1 | N |
| 1 | 1 | 0 | S |
| 1 | 1 | 1 | W |

*The bit stream "001" in bit positions 30–28, respectively, represents house numbers that consist of either an alphabetic character succeeded by up to three numeric characters, e.g. A7, G001 or an alphabetic character that is preceded by up to three numeric characters, e.g. 7A, 002G. Hereinafter a house number with bit stream "110" in bit positions 30–28 is referred to as a KC type and house numbers with bit streams "000", "100", "101", "110" or "111" in bit positions 30–28 are referred to as a non-KC type. Bits 27 through 0 constitute different meanings depending on whether a house number is of a KC type as defined above. In what follows the representation of bits 27–0 are divided in two groups depending on whether a house number is of a KC or a non-KC type.

KC TYPE

A "1" at bit 27 indicates that a house number begins with an alphabetic character and a "0" at bit 27 indicates that a house number begins with a numeric character.

Bits 26–22

These five bits determine the alphabetic character used in a house number according to the following table.

| Bits 26–22 | Character |
|---|---|
| 00000 | undefined |
| 00001 | A |
| 00010 | B |
| 00011 | C |
| 00100 | D |
| 00101 | E |
| 00110 | F |

-continued

| Bits 26–22 | Character |
|---|---|
| 00111 | G |
| 01000 | H |
| 01001 | I |
| 01010 | J |
| 01011 | K |
| 01100 | L |
| 01101 | M |
| 01110 | N |
| 01111 | O |
| 10000 | P |
| 10001 | Q |
| 10010 | R |
| 10011 | S |
| 10100 | T |
| 10101 | U |
| 10110 | V |
| 10111 | W |
| 11000 | X |
| 11001 | Y |
| 11010 | Z |
| 11011–11111 | Undefined |

Bits 21–12

These ten bits are currently not utilized and are set to zero. It is reserved for representing numbers greater than 999 and for representing other non-numeric characters.

Bits 11–2

These ten bits represent numeric characters present in a house number.

Bits 1–0

These two bits represent the number of leading zeroes preceding any numeric character according to the following table:

| Bit 3 | Bit 2 | result |
|---|---|---|
| 0 | 0 | no leading zeroes |
| 0 | 1 | 1 leading zero |
| 1 | 0 | 2 leading zeroes |
| 1 | 1 | 3 leading zeroes |

Bits 27–14

These fourteen bits represent numeric characters preceding an alphabetic character.

Bits 13–4

These ten bits represent numeric characters succeeding an alphabetic character.

Bits 3–2

These two bits represent the leading zeroes disposed before any numeric character preceding an alphabetic according to the following table:

| Bit 3 | Bit 2 | result |
|---|---|---|
| 0 | 0 | no leading zeroes |
| 0 | 1 | 1 leading zero |
| 1 | 0 | 2 leading zeroes |
| 1 | 1 | 3 leading zeroes |

Bits 1–0

These two bits represent the leading zeroes disposed after an alphabetic character and before a succeeding numeric character according to the following table:

| Bit 1 | Bit 0 | result |
| --- | --- | --- |
| 0 | 0 | no leading zeroes |
| 0 | 1 | 1 leading zero |
| 1 | 0 | 2 leading zeroes |
| 1 | 1 | 3 leading zeroes |

The data structure, in accordance with the present invention, advantageously requires a substantially smaller amount of memory space to store an alphanumeric house number than those of the prior art.

Another advantage of the data structure, in accordance with the present invention, is that it uses the same number of data bytes as those used to represent numeric house numbers and, as such, maintains compatibility with the memory unit of many vehicle navigation systems which can only process data that is four bytes wide.

Another advantage of the data structure, in accordance with the present invention, is that it requires only one relational operation to perform a sorting of numbers. The thirty two stream of bits of any given alphanumeric number are evaluated according to their positional dependence to determine their binary value and are compared to those of other numbers to determine the relative positions of the numbers in a hierarchical system. In other words, the magnitude of each number is compared to those of others to resolve the sorting hierarchy. For example, suppose that the following alphanumeric numbers are to be sorted in an increasing order:

```
G009
 4–107
11E010
100–007
7A
1040
 11–170
```

A one step application of a relational operation when applied to a binary representation of the above numbers, in accordance with the data structure of the present invention, will give rise to the following sorted results based on the binary values of the numbers:

```
1040
 4–107
 11–170
100–007
7A
G009
114E010
```

Another advantage of the data structure, in accordance with the present invention, is that it is capable of representing alphanumeric house numbers of up to 8 characters. As was discussed earlier, in a non-KC type house numbers, bits 27–4, represent numeric characters positioned on either side of an alphabetic character. The 14 bits preceding an alphabetic character allow representation of all numbers up to and including 16,383, and the 10 bits succeeding an alphabetic character allow representation of all numbers up to and including 1,023. Adding the alphabetic character represented by bits 30–28, excluding any leading zeroes, it becomes evident that house numbers of up to 8 characters in length may be represented with the data structure, in accordance with the present invention. Including the 6 leading zeroes, up to 14 characters may be stored and represented using the data structure, in accordance with the present invention.

This disclosure is illustrative and not limiting; further modification will be apparent to one skilled in the art in light of this disclosure and are intended to fall within the scope of the appended claims.

We claim:

1. In a mapping system, an exactly four-byte binary data structure encoded on a computer-readable medium for storing and representing substantially all house numbers, wherein each byte is 8 binary digits, wherein each said house number is either a string of numeric characters or a string of characters having numeric, alphabetic and special printable characters, wherein each said house number has up to 14 numeric or alphanumeric characters.

2. In a mapping system, an exactly four-byte binary data structure encoded on a computer-readable medium for storing and representing substantially all house numbers, wherein each byte is 8 binary digits, wherein each said house number is either a string of numeric characters or a string of characters having numeric, alphabetic and special printable characters, and wherein at least one bit in the data structure indicates the presence of non-numeric characters in said house number.

3. A data structure according to claim 2, wherein at least three bits in the data structure identify the non-numeric character used in said house number.

4. A data structure according to claim 2, wherein said non-numeric characters belong to a set comprising all the alphabetic characters and the character "-", wherein "-" is a hyphen.

5. A data structure according to claim 2, wherein at least five bits in the data structure identify the alphabetic character in said house number.

6. A data structure according to claim 2, wherein at least ten bits in the data structure identify the alphabetic or numeric characters in said house number.

7. A data structure according to claim 2, wherein at least ten bits in the data structure identify only numeric characters in said house number.

8. A data structure according to claim 2, wherein a binary '1' at bit position 31 of said data structure indicates the presence of a non-numeric character in said house number and wherein a binary '0' at bit position 31 of said data structure indicates the absence of a non-numeric character in said house number.

9. A data structure according to claim 8, wherein a bit stream "000" in bit positions 30-28 of said data structure, respectively, indicates the presence of a character hyphen "-" in said house number, wherein a bit stream "100" in bit positions 30-28 of said data structure, respectively, indicates the presence of a character "E" in said house number, wherein a bit stream "101" in bit positions 30-28 of said data structure, respectively, indicates the presence of a character "N" in said house number, wherein a bit stream "110" in bit positions 30-28 of said data structure, respectively, indicates the presence of a character "S" in said house number, wherein a bit stream "111" in bit positions 30-28 of said data structure, respectively, indicates the presence of a character "W" in said house number and wherein a bit stream "001" in bit positions 30-28 of said data structure, respectively, indicates that said house number includes either an alphabetic character succeeded by numeric characters or an alphabetic character preceded by numeric characters.

10. A data structure according to claim 9, wherein a bit stream "00" in bit positions 3-2 of said data structure, respectively, indicates the absence of leading zeroes, wherein a bit stream "01" in bit positions 3-2 of said data structure, respectively, indicates the presence of one leading zero, wherein a bit stream "10" in bit positions 3-2 of said data structure, respectively, indicates the presence of two leading zeroes, wherein a bit stream "11" in bit positions 3-2 of said data structure, respectively, indicates the presence of three leading zeroes, when said leading zeroes are defined to include only those zeroes which may appear before any numeric character preceding any said alphabetic character in said house number, bit positions 3-2 of said data structure to indicate the absence or the presence and the number of said leading zeroes only when bit positions 30-28 are either "000" or "100" or "101" or "110" or "111".

11. A data structure according to claim 10, wherein a bit stream "00" in bit positions 1-0 of said data structure, respectively, indicates the absence of any leading zeroes, wherein a bit stream "01" in bit positions 1-0 of said data structure, respectively, indicates the presence of one leading zero, wherein a bit stream "10" in bit positions 1-0 of said data structure, respectively, indicates the presence of two leading zeroes, wherein a bit stream "11" in bit positions 1-0 of said data structure, respectively, indicates the presence of three leading zeroes, when said leading zeroes are defined to include only those zeroes which may appear after said alphabetic character and before a numeric character succeeding said alphabetic character of said house number.

12. A data structure according to claim 11, wherein bit positions 27-14 of said data structure represent numeric characters appearing after any of said leading zeroes defined by bits 3-2 and before any alphabetic character.

13. A data structure according to claim 12, wherein bit positions 13-4 represent numeric characters appearing after any of said leading zeroes defined by bits 1-0.

14. A method of sorting the hierarchy of a collection of numeric or alphanumeric numbers with a data structure as defined in claim 12, said method comprising a one step application of relational operators to said numbers to arrange the numbers in an ascending or a descending hierarchical order based on the relative magnitude of said numbers.

15. A data structure according to claim 9, wherein a bit stream "0011" in bit positions 30-27 indicates that said house number begins with an alphabetic character succeeded by one or more numeric characters and wherein a bit stream "0010" in bit positions 30-27 indicates that said house number begins with a string of numeric character succeeded by an alphabetic character.

16. A data structure according to claim 15, wherein a bit stream "00001" in bit positions 26-22 indicates the presence of character "A" in said house number, wherein a bit stream "00010" in bit positions 26-22 indicates the presence of character "B" in said house number, wherein a bit stream "00011" in bit positions 26-22 indicates the presence of character "C" in said house number, wherein a bit stream "00100" in bit positions 26-22 indicates the presence of character "D" in said house number, wherein a bit stream "00101" in bit positions 26-22 indicates the presence of character "E" in said house number, wherein a bit stream "00110" in bit positions 26-22 indicates the presence of character "F" in said house number, wherein a bit stream "00111" in bit positions 26-22 indicates the presence of character "G" in said house number, wherein a bit stream "01000" in bit positions 26-22 indicates the presence of character "H" in said house number, wherein a bit stream "01001" in bit positions 26-22 indicates the presence of character "I" in said house number, wherein a bit stream "01010" in bit positions 26-22 indicates the presence of character "J" in said house number, wherein a bit stream "01011" in bit positions 26-22 indicates the presence of character "K" in said house number, wherein a bit stream "01100" in bit positions 26-22 indicates the presence of character "L" in said house number, wherein a bit stream "01101" in bit positions 26-22 indicates the presence of character "M" in said house number, wherein a bit stream "01110" in bit positions 26-22 indicates the presence of character "N" in said house number, wherein a bit stream "01111" in bit positions 26-22 indicates the presence of character "O" in said house number, wherein a bit stream "10000" in bit positions 26-22 indicates the presence of character "P" in said house number, wherein a bit stream "10001" in bit positions 26-22 indicates the presence of character "Q" in said house number, wherein a bit stream "10010" in bit positions 26-22 indicates the presence of character "R" in said house number, wherein a bit stream "10011" in bit positions 26-22 indicates the presence of character "S" in said house number, wherein a bit stream "10100" in bit positions 26-22 indicates the presence of character "T" in said house number, wherein a bit stream "10101" in bit positions 26-22 indicates the presence of character "U" in said house number, wherein a bit stream "10110" in bit positions 26-22 indicates the presence of character "V" in said house number, wherein a bit stream "10111" in bit positions 26-22 indicates the presence of character "W" in said house number, wherein a bit stream "11000" in bit positions 26-22 indicates the presence of character "X" in said house number, wherein a bit stream "11001" in bit positions 26-22 indicates the presence of character "Y" in said house number, wherein a bit stream "11010" in bit positions 26-22 indicates the presence of character "Z" in said house number.

17. A data structure according to claim 16, wherein bit positions 21-12 represent numbers larger than 999 and characters other than said alphabetic characters.

18. A data structure according to claim 17, wherein bit positions 11-2 represent numeric portions of said house number.

19. A data structure according to claim 18, wherein a bit stream "00" in bit positions 1-0 of said data structure, respectively, indicates the absence of any leading zeroes, wherein a bit stream "01" in bit positions 1-0 of said data structure, respectively, indicates the presence of one leading zero, wherein a bit stream "10" in bit positions 1-0 of said data structure, respectively, indicates the presence of two leading zeroes, wherein a bit stream "11" in bit positions 1-0 of said data structure, respectively, indicates the presence of three leading zeroes, when said leading zeroes are defined to include only those zeroes which may appear before a numeric character.

20. A method of sorting the hierarchy of a collection of numeric or alphanumeric numbers with a data structure as defined in claim 18, said method comprising a one step application of relational operators to said numbers to arrange the numbers in an ascending or a descending hierarchical order based on the relative magnitude of said numbers.

21. In a mapping system, an exactly four-byte binary data structure encoded on a computer-readable medium for storing and representing substantially all house numbers, wherein each byte is 8 binary digits, wherein each said house number is either a string of numeric characters or a string of characters having numeric, alphabetic and special printable characters, and wherein at least eight bits in the data structure identify the non-numeric character used in said house number.

22. In a mapping system, an exactly four-byte binary data structure encoded on a computer-readable medium for storing and representing substantially all house numbers, wherein each byte is 8 binary digits, wherein each said house number is either a string of numeric characters or a string of characters having numeric, alphabetic and special printable characters, and wherein at least two bits in the data structure indicate the number of leading zeroes, when said leading zeroes are defined to include only those zeroes which may appear after a non-numeric character and before a numeric character succeeding said non-numeric character of said house number.

23. In a mapping system, an exactly four-byte binary data structure encoded on a computer-readable medium for storing and representing substantially all house numbers, wherein each byte is 8 binary digits, wherein each said house number is either a string of numeric characters or a string of characters having numeric, alphabetic and special printable characters, and wherein at least two bits in the data structure indicate the number of leading zeroes if a bit stream "000" or "100" or "101" or "110" or "111" is present at bit positions 30-28, when said leading zeroes are defined to include only those zeroes which may appear before any numeric character p receding any non-numeric character in said house number.

24. A data structure according to claim 23, wherein at least 14 bits in the data structure represent numeric characters if a bit stream "000" or "100" or "101" or "110" or "111" is present at bit positions 30-28, wherein said numeric characters appear before a non-numeric character, said numeric characters not to include any said leading zeroes of said house number.

25. A data structure according to claim 24, wherein at least 10 bits in the data structure represent numeric characters if a bit stream "000" or "100" or "101" or "110" or "111" is present at bit positions 30-28, wherein said numeric characters appear after a non-numeric character, said numeric characters not to include any said leading zeroes of said house number.

26. In a mapping system, an exactly four-byte binary data structure encoded on a computer-readable medium for storing and representing substantially all house numbers, wherein each byte is 8 binary digits, wherein each said house number is either a string of numeric characters or a string of characters having numeric, alphabetic and special printable characters, and wherein at least one bit in the data structure identifies whether a numeric or an alphabetic character represents the first character of said house number.

27. A method of representing a house number in a mapping system including a data structure encoded on a computer-readable medium, comprising the steps of:

establishing a house number data structure;

assigning exactly four bytes having 32 bits to represent each house number, wherein said house number is all numeric characters or is numeric and special printable characters, and wherein at least one bit in the data structure indicates the presence of non-numeric characters in said house number.

* * * * *